United States Patent [19]
Futatsugi et al.

[11] Patent Number: 5,533,141
[45] Date of Patent: Jul. 2, 1996

[54] PORTABLE PEN POINTING DEVICE AND A PROCESSING SYSTEM WITH PEN POINTING DEVICE

[75] Inventors: Seiji Futatsugi, Inagi; Keiji Kojima, Sagamihara; Yoshiki Matsuda, Kokubunji; Yoshinori Kitahara, Musashimurayama; Masato Mogaki, Hachioji, all of Japan

[73] Assignee: Hitachi, Ltd., Tokyo, Japan

[21] Appl. No.: 996,039

[22] Filed: Dec. 23, 1992

[30] Foreign Application Priority Data

Dec. 27, 1991 [JP] Japan .................. 3-346342

[51] Int. Cl.⁶ .................................. G06K 9/00
[52] U.S. Cl. ........................... 382/119; 382/188
[58] Field of Search .................. 382/3, 13, 59, 382/119–123, 186–189, 314; 340/707; 178/18, 19, 20

[56] References Cited

U.S. PATENT DOCUMENTS

| | | | |
|---|---|---|---|
| 4,241,409 | 12/1980 | Nolf | 382/59 |
| 5,054,088 | 10/1991 | Gunderson et al. | 382/3 |
| 5,063,600 | 11/1991 | Norwood | 382/13 |
| 5,077,802 | 12/1991 | Plamodon | 382/3 |
| 5,111,512 | 5/1992 | Fan et al. | 382/3 |
| 5,150,420 | 4/1992 | Haraguchi | 382/13 |
| 5,165,102 | 11/1992 | Sawyer | 382/3 |
| 5,166,666 | 11/1992 | Tanaka | 340/706 |
| 5,199,068 | 3/1993 | Cox | 382/13 |
| 5,215,397 | 6/1993 | Taguchi et al. | 382/59 |
| 5,227,590 | 7/1993 | Protheroe et al. | 178/18 |
| 5,294,792 | 3/1994 | Lewis et al. | 382/13 |
| 5,301,243 | 4/1994 | Olschafskie et al. | 382/59 |

*Primary Examiner*—Joseph Mancuso
*Attorney, Agent, or Firm*—Antonelli, Terry, Stout & Kraus

[57] ABSTRACT

A portable pen pointing device and a processing system with pen pointing device which can be easily used. The portable pen pointing device includes a memory for storing user's specific penmanship/handwriting information and a pen interface unit for supplying the user's specific penmanship/handwriting information to a processor body of the processing system. The processor body interprets a writing sample on the basis of the user's specific penmanship/handwriting information supplied from the portable pen pointing device through the pen interface unit thereof. With this construction, there is no need to read information from a storage medium such as a flexible disk in which a user's specific dictionary for penmanship/handwriting interpretation is written. Also, an operation of establishing a certain writing environment becomes unnecessary or easy.

12 Claims, 10 Drawing Sheets

FIG. 12
PRIOR ART

|  | STANDARD PEN HANDLING | USER DEFINED PEN HANDLING |
|---|---|---|
| SELECTION | (abcde) | abcde |
| DELETION | ~~abcde~~ | ~~abcde~~ |
| INSERTION POINT DESIGNATION | abcde | abcde |

PORTABLE PEN POINTING DEVICE AND A PROCESSING SYSTEM WITH PEN POINTING DEVICE

BACKGROUND OF THE INVENTION

The present invention relates to a portable pen pointing device and a processing or computer system with pen pointing device. More particularly, the present invention relates to a portable pointing device which has the form of a portable pen and is handled like a pen to input information to a processing system body and a processing system which receives information input using such a portable pen pointing device.

In recent years, there has been proposed a processing system using a pen pointing device which inputs information by making a trace on a tablet or the like as a pen traces or depicts a character or figure (hereinafter referred to as a processing system with pen pointing device).

The processing system with pen pointing device includes a pen pointing device which is handled like a pen by a user and a processing system body which receives information by detecting and interpreting the handling of the pen pointing device by the user (hereinafter referred to as pen handling).

The processing system body detects the pen handling by receiving an electromagnetic wave transmitted from a pen point of the pen pointing device or detecting a position at which the pen point presses a tablet. Using a dictionary for pen handling interpretation, the processing system body interprets the detected pen handling as an instruction including the input or deletion of a character or figure, the correction of a document, and so on.

A method of interpreting the pen handling on the basis of the dictionary for pen handling interpretation is disclosed by, for example, "BASIC CHARACTER/FIGURE RECOGNITION TECHNIQUES" written by Shunji Mori and published by The OHM sha Ltd.

A specific example will be explained in reference to FIGS. 9 and 10 in conjunction with the case where a hand-written character is interpreted from its trace. Though an example using a Japanese character is explained herein, the same holds for another language.

Referring to FIG. 9, the trace of a handwritten character 200 is sampled through division by a lattice (step 201) to extract lines of vertical, horizontal and oblique directions as strokes (step 202).

The extracted strokes are correlated with one item of a dictionary for pen handling interpretation, for example, an item 302 shown in FIG. 10. Namely, each extracted stroke is compared with a stroke of the corresponding direction in a trace column 303 of an item content 301 and the result of comparison is numerically quantized as the degree of correlation (step 203). The summation of numeric values for the respective strokes as the degrees of correlation is produced to provide the degree of matching of the hand-written character 200 for the item 302 (step 204).

The processings of steps 203 and 204 are performed for all items of the dictionary for pen handling interpretation (step 206) and an item having the greatest degree of matching is determined (step 207). And, a character code of the determined item is output (step 208). For example, in the case of the shown hand-written character 200, it has the greatest degree of matching with the item "z,1" (kanji meaning "book" in English) and a character code of "z,1" is output.

In the example shown above, the hand-written character is recognized from the trace of a pen handling. Actually, writing order information, writing pressure information and speed information are collected or acquired in addition to the trace information in order to reduce an error of interpretation by taking those information into consideration. For that purpose, writing order information, writing pressure information and speed information are described in the corresponding columns of the item content 301, as shown in FIG. 10. In the writing pressure column or the speed column, the strength of writing pressure or the the magnitude of speed is graphed in a direction orthogonal to the stroke.

A user's pen handling is subjective to the user's penmanship/handwritting. Therefore, a user defined item 402 is provided in the dictionary for pen handling interpretation, as shown in FIG. 11.

Since the user defined item 402 is defined by the user, it is possible to reflect the user's specific penmanship/handwriting. For example, in an item content 401 compared with the item content 301, the user's specific penmanship/handwritting is reflected in the direction of the fifth writing order.

The same explanation holds for instructions of correction including "selection" "deletion" and "insertion". Namely, a standard pen handling and a user defined pen handling for each instruction are provided in the dictionary for pen handling interpretation, as shown in FIG. 12.

Thus, a processing system with pen pointing device needs to have a user's specific dictionary for pen handling interpretation in which a user's specific penmanship/handwritting is taken into consideration.

Therefore, a processing system with pen pointing device ordinarily used by a certain user must always be provided with a user's specific dictionary for pen handling interpretation. When that user desires to use a processing system with pen pointing device which he or she does not ordinarily use, it is required that the processing system with pen pointing device reads information from a storage medium such as a flexible disk in which the user's specific dictionary for pen handling interpretation is written.

Accordingly, in the conventional method employed in the case where a certain user uses a processing system with pen pointing device used by another user, it is necessary to make an operation of newly reading information from a flexible disk with a dictionary for pen handling interpretation specific to the certain user into the processing system to be used or an operation of establishing a pen handling environment. As a result, there is a problem that a substantial time or labor or a special knowledge is required.

SUMMARY OF THE INVENTION

An object of the present invention is to provide a portable pen pointing device and a processing system with pen pointing device which are improved such that they can easily be utilized.

According to a first aspect of the present invention, there is provided a portable pen pointing device which has the form of a portable pen and is handled like a pen to input information to a processing system body, comprising memory means for storing a user's specific penmanship/handwriting information corresponding to a specific user and pen interface means for supplying the user's specific information to the processing system body.

According to a second aspect of the present invention, there is provided a processing system with pen pointing device comprising the above-mentioned portable pen pointing device and a processing system body for acquiring information for interpretation of penmanship/handwriting on the basis of the user's specific information supplied from the portable pen pointing device.

In the portable pen pointing device and the processing system with pen pointing device according to the present invention, the user's specific penmanship/handwriting information corresponding to the user is stored in the memory means of the portable pen pointing device. This user's specific information is supplied through the pen interface means of the portable pen pointing device to the processing system body in which the information is to be used. The processing system body acquires information for penmanship/handwriting interpretation from the user's specific penmanship/handwriting information supplied from the portable pen pointing device and interprets a user's penmanship/handwriting.

With the above construction of the present invention, the need to read information from a storage medium such as a flexible disk in which a user's specific dictionary for penmanship/handwriting interpretation is written is eliminated. Also, an operation of establishing a penmanship/handwriting environment becomes unnecessary or easy.

BRIEF DESCRIPTION OF THE DRAWINGS

FIG. 12 is a diagram showing an example of a standard pen handling and a user defined pen handling in the conventional dictionary for pen handling interpretation.

DESCRIPTION OF THE PREFERRED EMBODIMENTS

The present invention will now be described on the basis of embodiments shown in the accompanying drawings. However, the invention is never limited to the shown embodiments.

Figure 1:
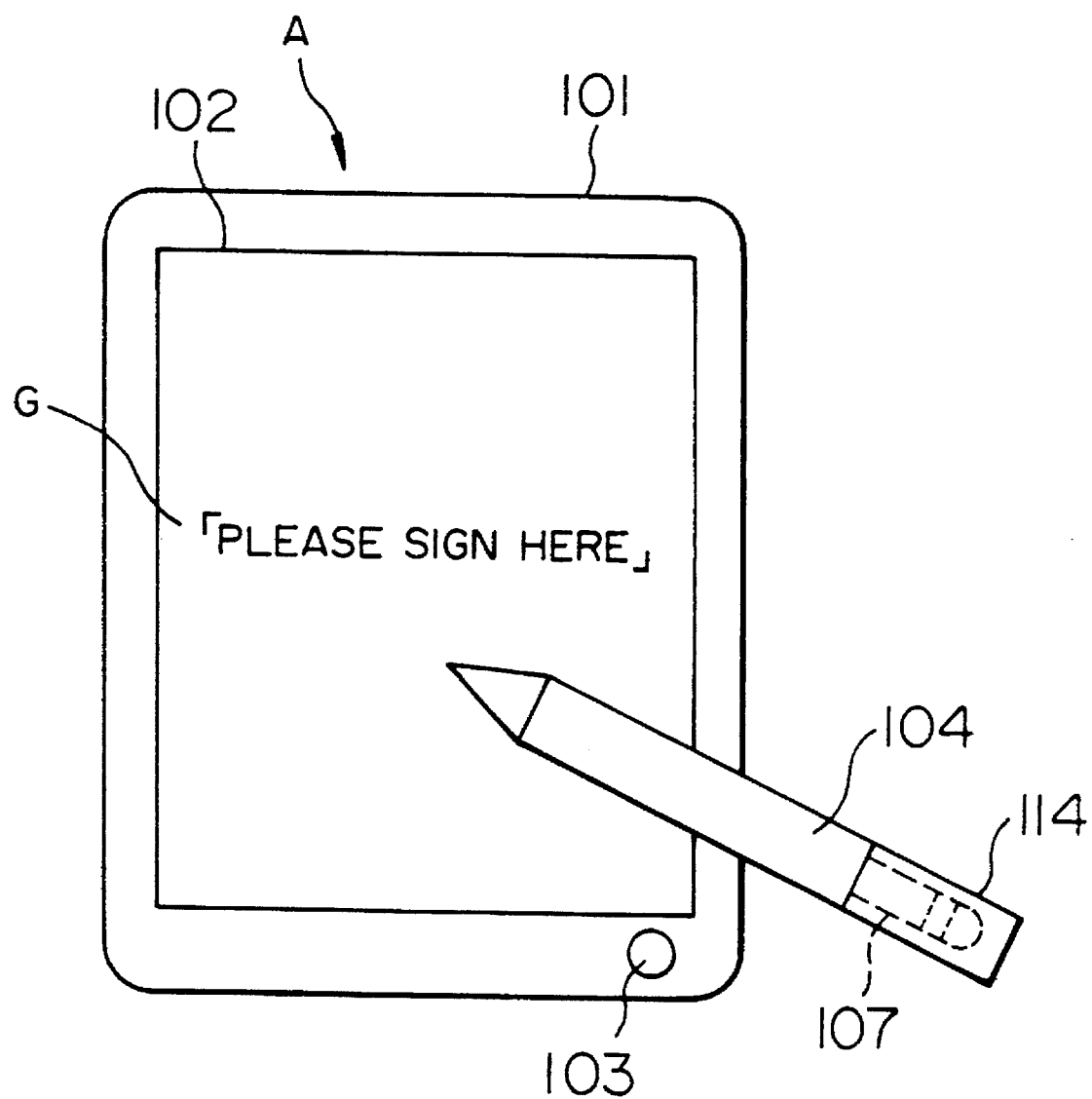
FIG. 1 is a broad view of a pen pointing device and a processing system with pen pointing device according to an embodiment of the present invention.

FIG. 1 is a sketch view of a pen pointing device and a processing system with pen pointing device according to an embodiment of the present invention.

In the processing system A with pen pointing device according to the present embodiment, a tablet device 102 also serving as a display device is set in a processing system body 101. Also, the processing system body 101 is provided with an interface unit 103.

A message from the processing system body 101 can be displayed on an input surface G of the tablet device 102.

A pen pointing device 104 has the form of a portable pen and is each individual user has his or her own personal portable pen. A pen interface unit 107 is exposed by removing a rear cap 114 of the pen pointing device 104.

A user can handle the pen pointing device 104 on the input surface G of the tablet device 102 as if he or she writes on a paper by use of a pen. (Such an operation will hereinafter be referred to as penmanship/writing.) This penmanship/writing is transmitted to the processing system body 101 through the tablet device 102 so that the input of a handwritten character or figure or the correction of a document is effected.

When the user exposes the pen interface unit 107 and inserts it into the interface unit 103 provided in a recessed portion of the processing system body 101 so that the interface unit 103 and the pen interface unit 107 are brought into engagement with each other in a concavo-convex relationship, the processing system body 101 and the pen pointing device 104 are electrically connected with each other so that information is communicated or switched therebetween.

Figure 2:
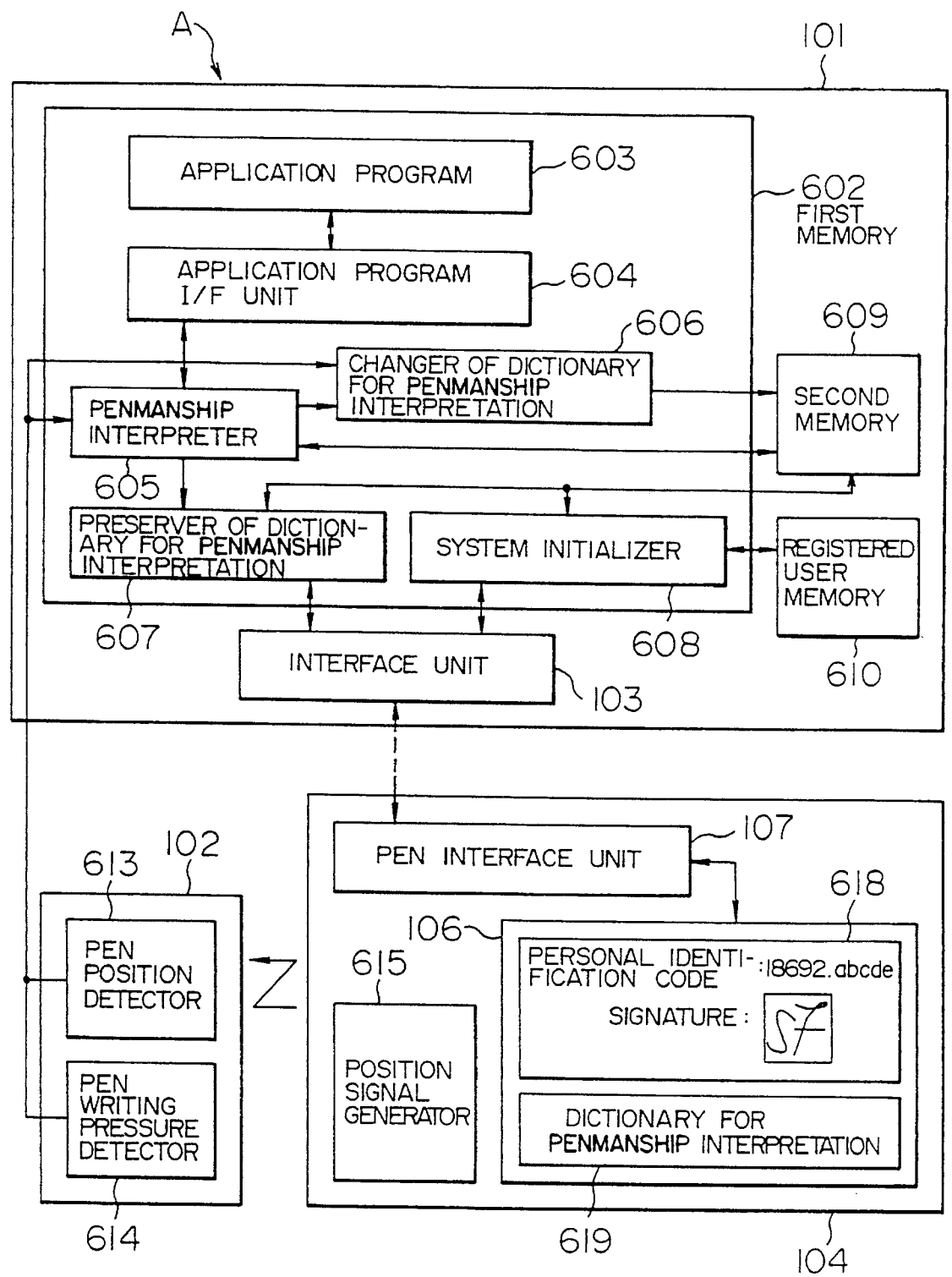
FIG. 2 is a block diagram of a main part of the processing device with pen pointing device shown in FIG. 1.

FIG. 2 shows a block diagram of a main part of the processing system A with pen pointing device shown in FIG. 1.

The pen pointing device 104 includes a memory 106, a pen interface unit 107 and a position signal generator 615.

The memory 106 stores personal identification information 618 and a dictionary 619 for pen handling interpretation.

The personal identification information 618 includes a personal identification code (indicated by "18692. abcde" for example, in FIG. 2) and a personal signature. The former portion "18692" of the personal identification code represents a user ID for identifying a user and the latter portion "abcde" thereof represents a computer ID for identifying a host computer ordinarily used by the user.

The dictionary 619 for penmanship/handwriting interpretation includes user's specific contents defined by each individual user in order that the permanship/handwriting interpretation can be made taking the user's specific penmanship/handwriting into consideration.

The pen interface unit 107 is provided for switching information between the memory 106 and the processing system body 101.

The position signal generator 615 generates an electromagnetic wave for detection of the position of a pen point of the pen pointing device 104.

The processing system body 101 includes a first memory 602 for storing various processings, a second memory 609 for copying the dictionary 619 for penmanship/handwriting interpretation in the pen pointing device 104, a registered user memory 610 for storing personal identification codes of users permitted to use the processing system body 101, and an interface unit 103 for fetching contents stored in the memory 106 of the pen pointing device 104.

The first memory 602 stores a system initializer 608, a penmanship/handwriting interpreter 605, a changer 606 of dictionary for penmanship/handwriting interpretation, a preserver 607 of dictionary for penmanship/handwriting interpretation, an application program I/F unit 604 and an application program 603.

The tablet device 102 includes a pen position detector 613 and a pen writing pressure detector 614 for acquiring information of a penmanship/handwriting trace by a pen handling on the input surface G, and writing order information, writing pressure information and speed information which include the direction of a stroke.

The pen position detector 613 detects the position of the pen point by means of an electromagnetic wave generated from the position signal generator 615 in the pen pointing device 104 to acquire trace information or the like corresponding to a specific penmanship/handwriting.

The pen writing pressure detector 614 detects a depressing force of the pen point of the pen pointing device 104 against the input surface G of the tablet device 102 to acquire writing pressure information or the like corresponding to a penmanship/handwriting.

Next, the operation of the processing system A with pen pointing device will be explained in accordance with flow charts shown in FIGS. 3 to 6.

Figure 3:
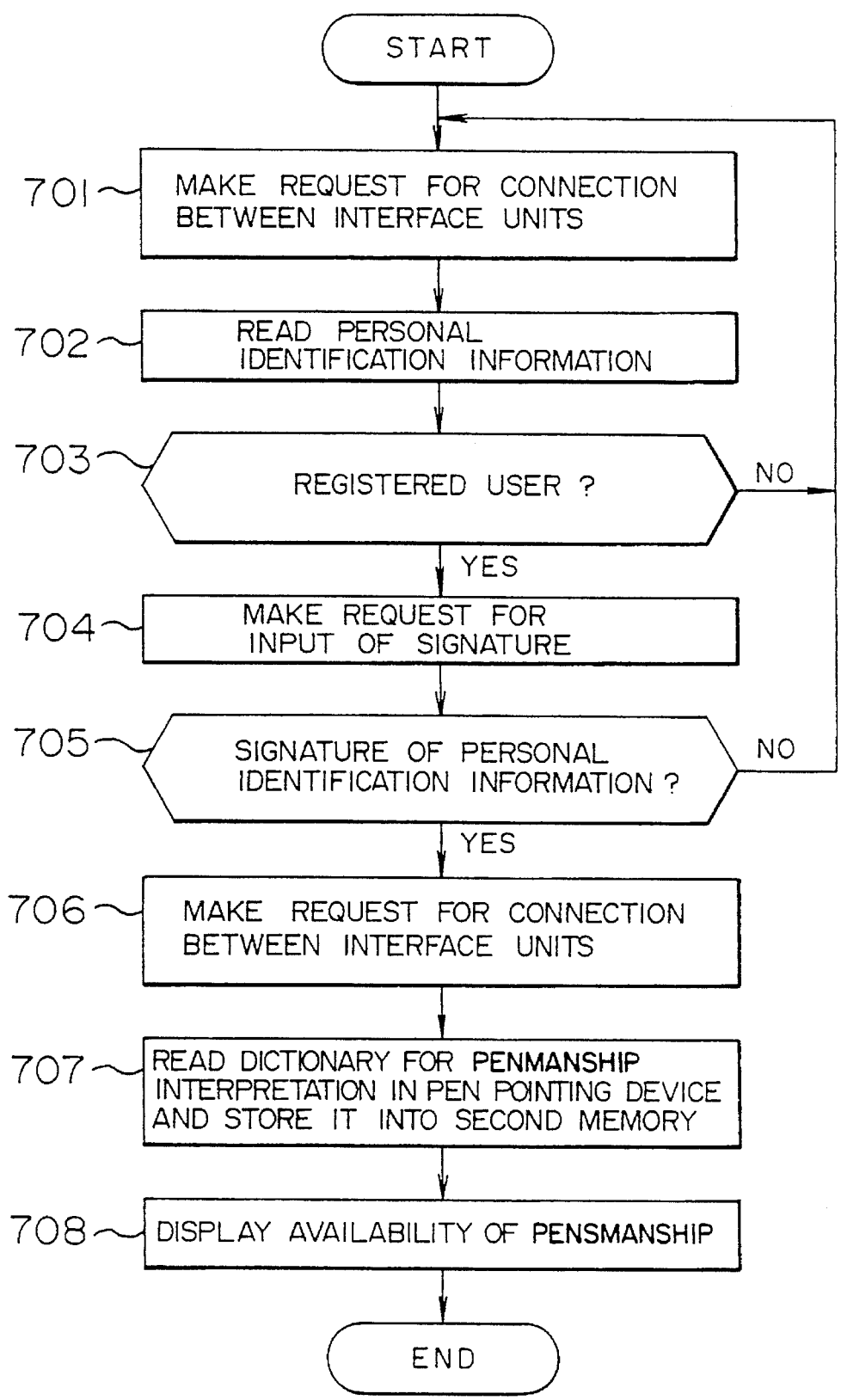
FIG. 3 is a flow chart showing a processing performed by a system initializer in the processing system with pen pointing device shown in FIG. 1.

FIG. 3 shows a flow chart of a processing performed by the system initializer 608.

The system initializer 608 is activated when a power supply to the processing system body 101 is turned on.

In step 701, a message is output which makes a request for the connection of the pen interface unit 107 of the pen pointing device 104 to the interface unit 103 of the processing system body 101. This message is displayed on the input surface G of the tablet device 102 which also serves as a display device.

A user connects the pen interface unit 107 of the pen pointing device 104 to the interface unit 103 of the processing system body 101.

In step 702, personal identification information 618 stored in the memory 106 of the pen pointing device 104 is read through the pen interface unit 107 and the interface unit 103.

In step 703, the judgement is made as to whether or not personal identification code of the read personal identification information 618 is registered as one of the personal identification codes of registered users stored in the registered user memory 610. In the case where the personal identification code of the read personal identification information 618 is registered, the processing proceeds to step 704. In the case where it is not registered, the processing returns to step 701.

In step 704, a message making a request for the input of a signature is displayed on the input surface G of the tablet device 102.

The user removes the pen interface unit 107 of the pen pointing device 104 from the interface unit 103 of the processing system body 101 and writes his or her signature on the input surface G of the tablet device 102 through using the pointing device pen.

In step 705, the judgement is made as to whether or not information from the tablet device 102 concerning a trace by the penmanship/handwriting is coincident with a signature of the read personal identification information 618. In the case where the trace information is coincident with the signature of the personal identification information, the processing proceeds to step 706. In the case where it is not coincident with the signature, the processing returns to step 701.

In step 706, a message is output which makes a request for the connection of the pen interface unit 107 of the pen pointing device 104 to the interface unit 103 of the processing system body 101.

The user connects the pen interface unit 107 of the pen pointing device 104 to the interface unit 103 of the processing system body 101.

In step 707, a dictionary 619 for penmanship/handwriting interpretation stored in the memory 106 of the pen pointing device 104 is read and is then stored into the second memory 609 of the processing system body 101. In the following, the dictionary for penmanship/handwriting interpretation stored in the second memory 609 will be denoted by reference numeral 619α.

In step 708, a message informing that the input by a penmanship/handwriting is possible or available, is displayed on the input surface G of the tablet device 102.

In a stage when the processing by the system initializer 608 has thus been completed, the process turns to the penmanship/handwriting interpreter 605 and the use of the processing system A with pen pointing device based on the user's specific dictionary 619α for penmanship/handwriting interpretation stored in the second memory 609 becomes enabled.

After having confirmed the above message, the user removes the pen interface unit 107 of the pen pointing device 103 from the interface unit 103 of the processing system body 101 and writes on the input surface G of the tablet device 102 by means of the pen pointing device 104.

Figure 4:
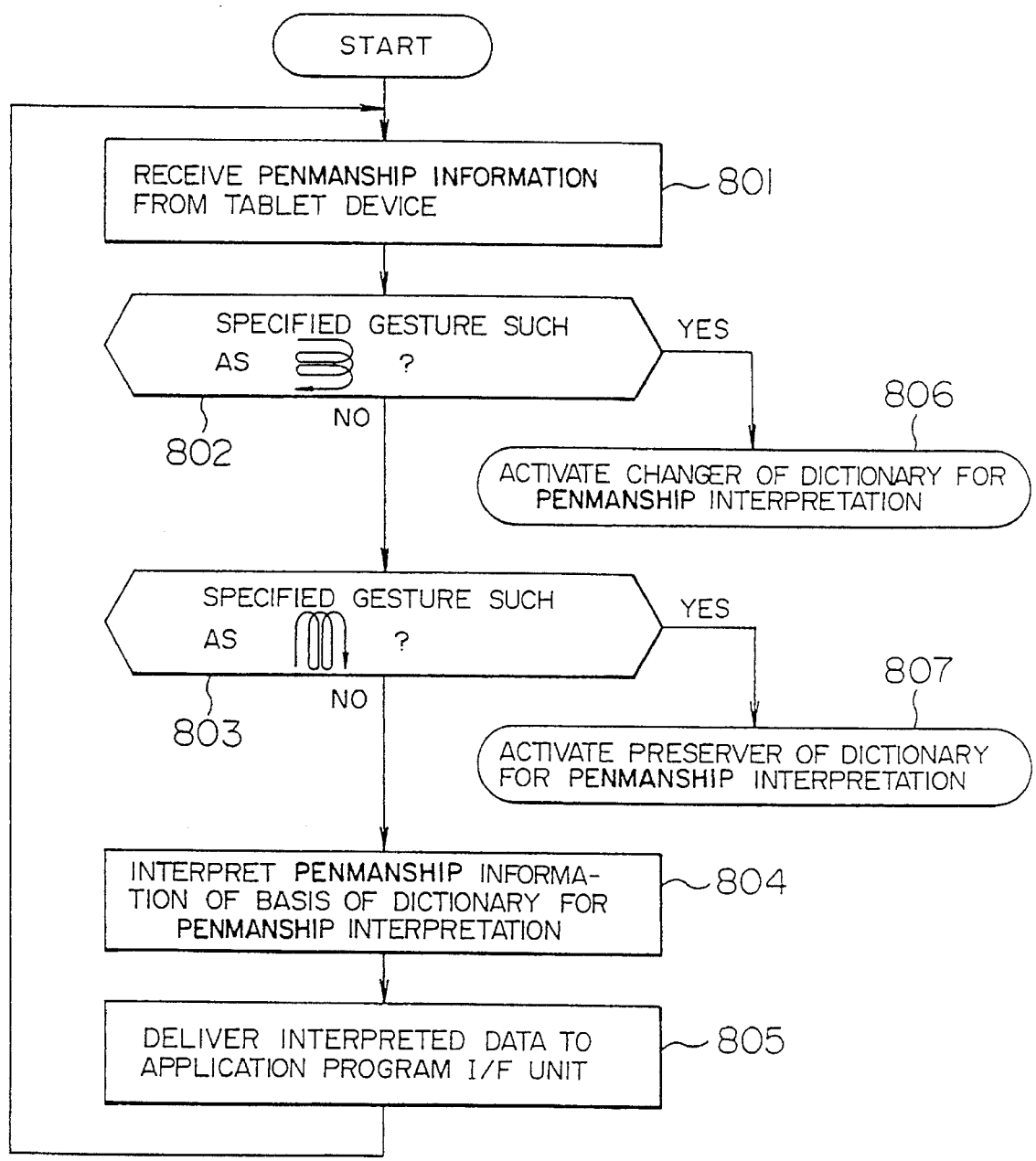
FIG. 4 is a flow chart showing a processing performed by a pen handling interpreter in the processing system with pen pointing device shown in FIG. 1.

FIG. 4 shows a flow chart of a processing performed by the penmanship/handwriting interpreter 605.

The user writes on the input surface G of the tablet device 102 in accordance with an ordinary operation.

In step 801, trace information, writing order information, writing pressure information and speed information derived from the penmanship/handwriting (hereinafter referred to as penmanship/handwriting information) are received from the tablet device 102.

In step 802, the judgement is made as to whether or not the penmanship/handwriting information instructs "change of contents of dictionary 619α for penmanship/handwriting interpretation". A specified gesture such as "writing horizontally reciprocating line three times" is assigned for this instruction. In the case where it is determined that the penmanship/handwriting information is such a specified gesture, the flow proceeds to step 806 in which the changer 606 of dictionary for penmanship/handwriting interpretation is activated. A processing performed by the changer 606 of dictionary for penmanship/handwriting interpretation will be mentioned later on. In the case where it is determined that the penmanship/handwriting information is not the specified gesture, the processing proceeds to step 803.

In step 803, the judgement is made as to whether or not the penmanship/handwriting instructs "preservation of dictionary 619α for penmanship/handwriting interpretation". A specified gesture such as "writing vertically reciprocating line three times" is assigned for this instruction. In the case where it is determined that the penmanship/handwriting information is such a specified gesture, the flow proceeds to step 809 in which the preserver 607 of dictionary for penmanship/handwriting interpretation is activated. A processing performed by the preserver 607 of dictionary for penmanship/handwriting interpretation will be mentioned later on. In the case where it is determined that the penmanship/handwriting information is not the specified gesture, the flow proceeds to step step 804.

In step 804, the penmanship/handwriting information is interpreted on the basis of the dictionary 619α for penmanship/handwriting interpretation.

In step 805, interpreted data is delivered to the application program I/F unit 604. Thereafter, the processing returns to step 801 to receive the next penmanship/handwriting information.

The application program I/F unit 604 delivers the interpreted data to the application program 603 after conversion of the data into an input format such as word processor software which is adapted to the application program 603.

Figure 5:
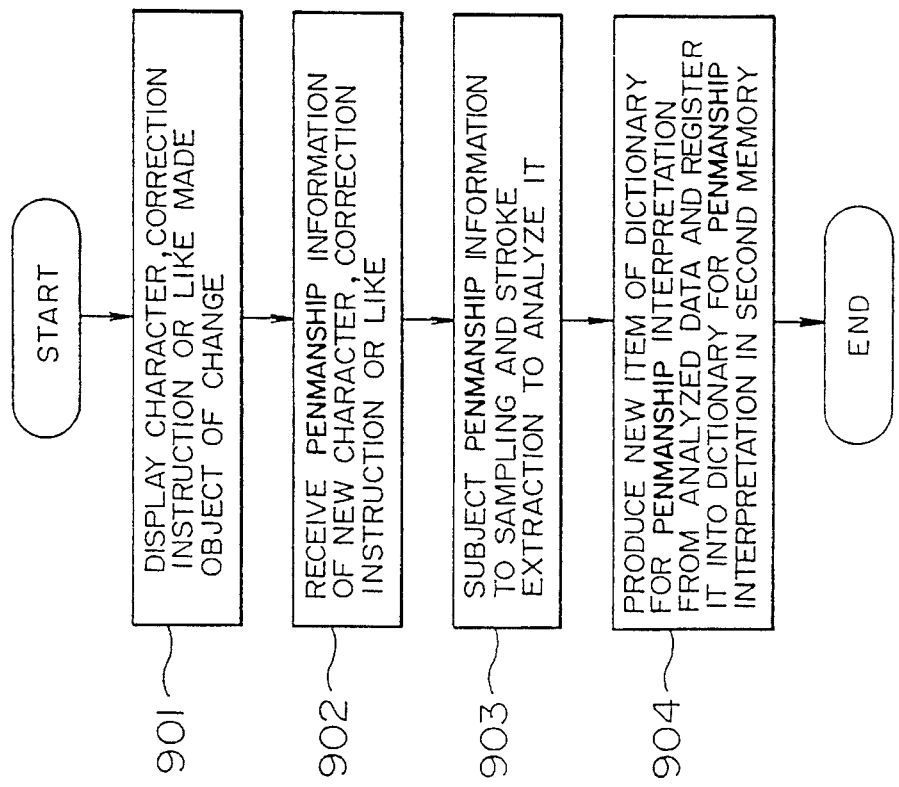
FIG. 5 is a flow chart showing a processing performed by a changer of dictionary for pen handling interpretation in the processing system with pen pointing device shown in FIG. 1.

The processing of the changer 606 of dictionary for penmanship/handwriting interpretation is performed in accordance with a flow chart shown in FIG. 5.

In step 901, a character, correction instruction or the like input immediately before the specified gesture (or the penmanship/handwriting of horizontally reciprocating line three times) as mentioned above is made the object of change, and the character, correction instruction or the like made the object of change is displayed on the input surface G of the tablet device 102.

After having confirmed the display of the character, correction instruction or the like made the object of change, the user writes a new character, correction instruction or the like to be substituted for the character, correction instruction or the like made the object of change.

In step 902, penmanship/handwriting information of the new character, correction instruction or the like based on the penmanship/handwriting is received.

Figure 9:
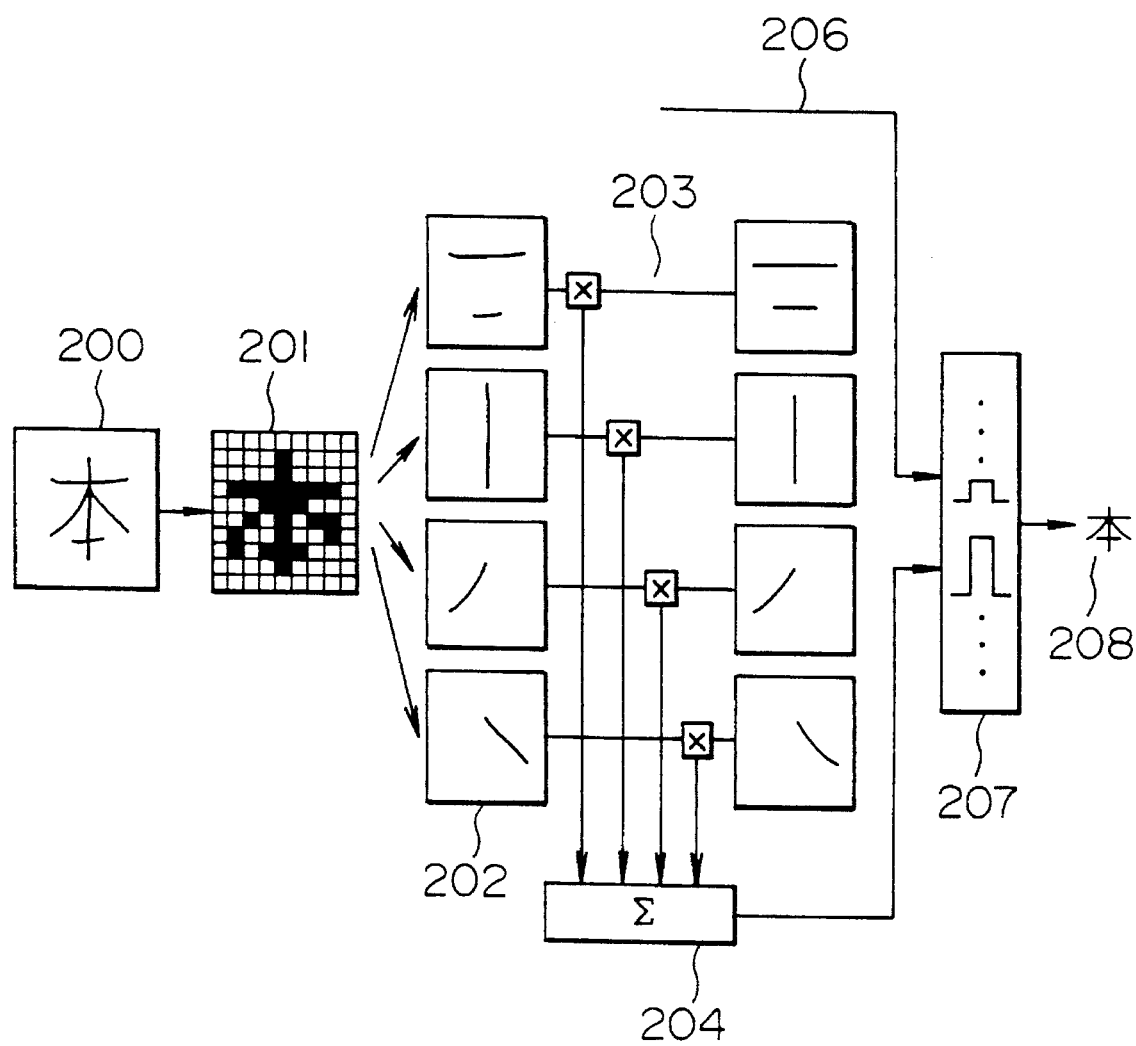
FIG. 9 is a diagram for explaining the conventional hand-written character recognition method.
Figure 10:
FIG. 10 is a diagram showing an example of an item of the conventional dictionary for pen handling interpretation.

In step 903, the received penmanship/handwriting information is subjected to sampling and stroke extraction processings similar to the processings of steps 201 and 202 shown in FIG. 9 and analysis is then made of each of trace information, writing order information, writing pressure information and speed information.

Figure 11:
FIG. 11 is a diagram showing an example of a user defined item of the conventional dictionary for pen handling interpretation.

In step 904, the analyzed data is described in a format of the item content 401 shown in FIG. 11 to produce a new item of dictionary for penmanship/handwriting interpretation (or user defined dictionary item) and the new item for dictionary for penmanship/handwriting interpretation is registered into the dictionary 619α stored in the second memory 609. At this time, the penmanship/handwriting interpretation dictionary item of the object of change having been used is erased. And, a message giving notice of the completion of the processing of the changer 606 of dictionary for penmanship/handwriting interpretation is displayed on the input surface G of the tablet device 102.

At a stage when the processing of the changer 606 of dictionary for penmanship/handwriting interpretation has been completed, the process turns to the penmanship/handwriting interpreter 605.

Figure 6:
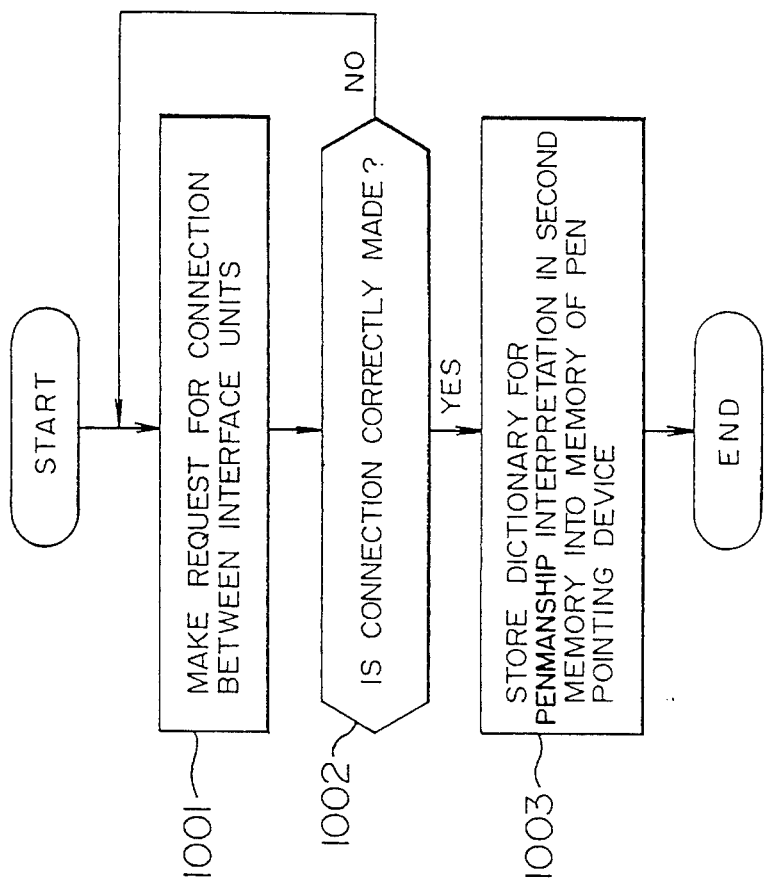
FIG. 6 is a flow chart showing a processing performed by a preserver of dictionary for pen handling interpretation in the processing system with pen pointing device shown in FIG. 1.

The processing of the preserver 607 of dictionary for penmanship/handwriting interpretation is performed in accordance with a flow chart as shown in FIG. 6.

In step 1001, a message making a request for the connection of the pen interface unit 107 of the pen pointing device 104 to the interface unit 103 of the processing system body 101 is displayed on the input surface G of the tablet device 102.

The user connects the pen interface unit 107 of the pen pointing device 104 to the interface unit 103 of the processing system body 101.

In step 1002, the judgement is made as to whether or not the connection is correctly made. If the connection is correctly made, the processing proceeds to step 1003.

In step 1003, the dictionary 619α for penmanship/handwriting interpretation stored in the second memory 609 is stored into the memory 106 of the pen pointing device 104 through the interface unit 103 and the pen interface unit 107. A message giving notice of the completion of the processing of the preserver 607 of dictionary for penmanship/handwriting interpretation is displayed on the input surface G of the tablet device 102.

In a stage when the processing of the preserver 607 of dictionary for penmanship/handwriting interpretation has been completed, the process turns to the penmanship/handwriting interpreter 605.

According to the processing system A with pen pointing device mentioned above, if a user carries his or her pen pointing device 104, the user can make use of his or her pen pointing device even when he or she uses a different processing system A which exists at his or her destination.

Figure 7:
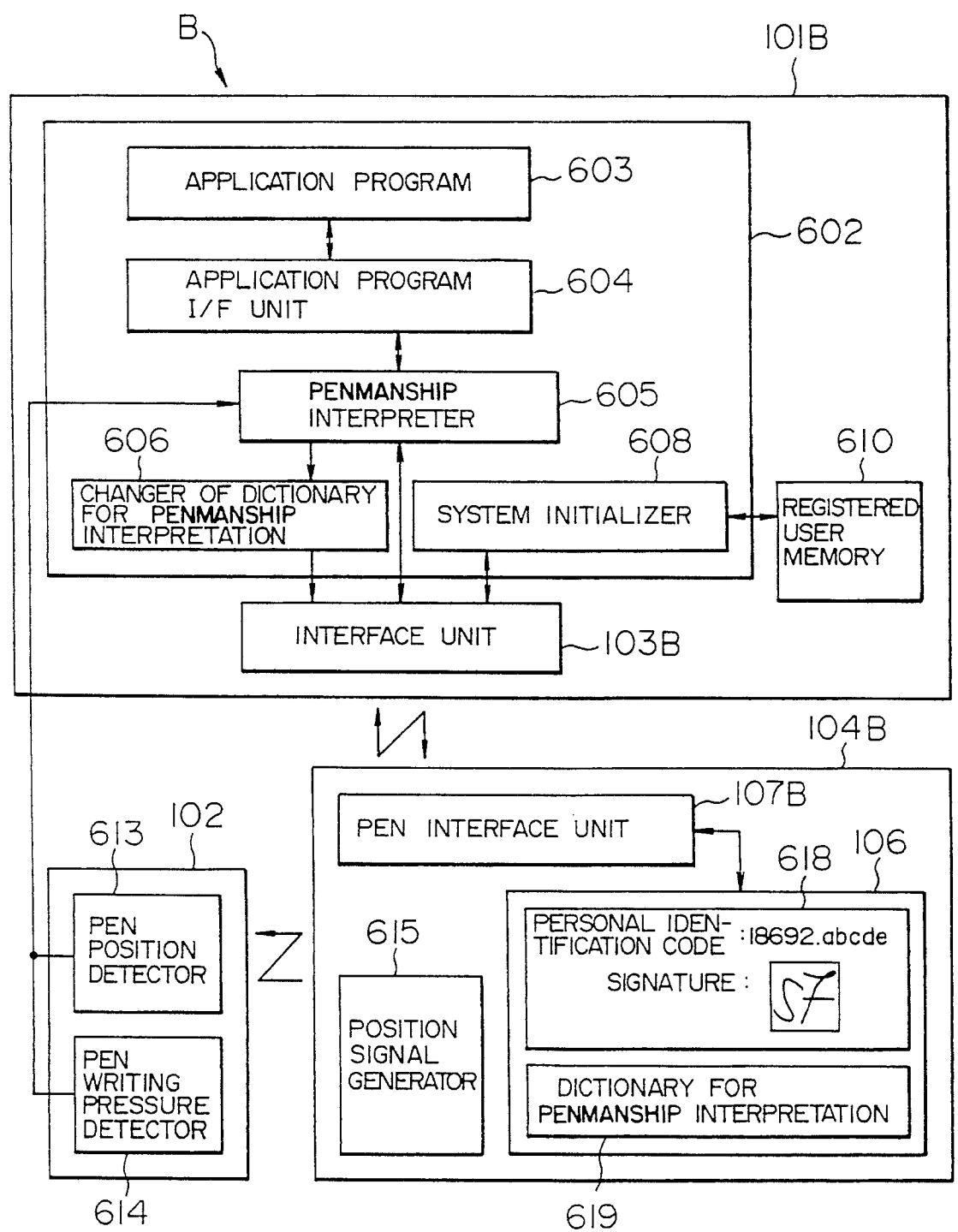
FIG. 7 is a block diagram of a main part of a pen pointing device and a processing system with pen pointing device according to another embodiment of the present invention.

FIG. 7 is a block diagram of a main part of a processing system B with pen pointing device according to another embodiment of the present invention.

The processing system B with pen pointing device according to this embodiment is different from the processing system A with pen pointing device in that an interface unit 103B of a processing system body 101B and a pen interface unit 107B of a pen pointing device 104B are coupled by electric wave or light in a non-contact relation and that the second memory 609 and the preserver 607 of dictionary for penmanship/handwriting interpretation are not provided in the processing system body 101B. In FIG. 7, components similar or equivalent to those of the processing system A with pen pointing device shown in FIG. 2 are designated by the same reference numerals as those used in FIG. 2.

In the processing system B with pen pointing device, a penmanship/handwriting interpreter 605 interprets penmanship/handwriting information while referring to a dictionary 619 for penmanship/handwriting interpretation in the pen pointing device 104B through the interface unit 103B and the pen interface unit 107B. Therefore, the second memory 609 and the preserver 607 of dictionary for penmanship/handwriting interpretation are eliminated.

Figure 8:
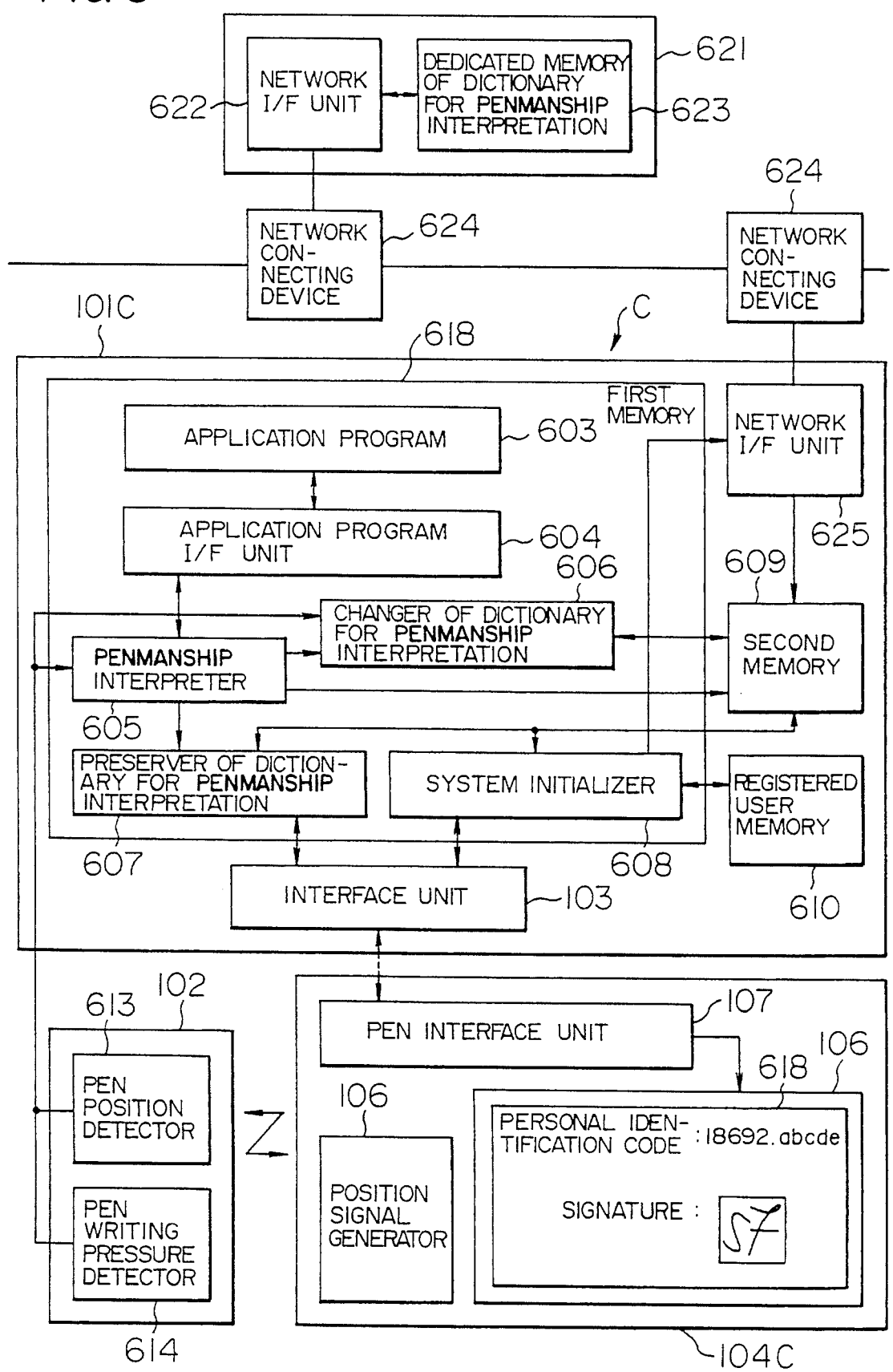
FIG. 8 is a block diagram of a main part of a pen pointing device and a processing system with pen pointing device according to a further embodiment of the present invention.

FIG. 8 is a block diagram of a main part of a processing system C with pen pointing device according to a further embodiment of the present invention.

In the processing system C with pen pointing device according to this embodiment, a network I/F unit 625 is provided in a processing system body 101C and is connected through network connecting devices 624 to a plurality of host processors or computers including a host computer 621. Only personal identification information 618 is stored in a memory 106 of a pen pointing device 104C. Excepting the above points, the construction of the processing system C with pen pointing device is similar to that of the processing system A with pen pointing device.

The host computer 621 ordinarily used by a user has a dedicated memory 623 of dictionary for penmanship/handwriting interpretation and a user's specific dictionary for penmanship/handwriting interpretation is stored in the dedicated memory 623.

In the processing system C with pen pointing device, a system initializer 608 performs the processings of steps 701 to 706 as in the processing system A with pen pointing device and thereafter accesses the host computer 621 through the network connecting devices 624 on the basis of the latter portion "abcde" of personal identification information. The user's specific dictionary for penmanship/handwriting interpretation stored in the dedicated memory 623 of the host computer 621 is read and is stored into a second memory 609 of the processing system body 101C.

According to the portable pen pointing device of the present invention, there is no longer a need to read information from a storage medium such as a flexible disk in which a user's specific dictionary for penmanship/handwriting interpretation is written. Also, an operation of establishing a writing environment becomes unnecessary or easy. Accordingly, the processing system with pen pointing device can easily be used even with no special knowledge.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

We claim:

1. A portable pen pointing device in the form of a portable pen and which is handled like a pen to input information to a separate processor body, the portable pen pointing device comprising:

memory means for storing user-specific information, wherein said user-specific information includes the user's signature for identifying the user, user-specific penmanship/handwriting information for interpreting the user's penmanship/handwriting when the user inputs a writing sample to said processor body using said portable pen pointing device, and a user-specific personal identification code; and pen interface means for supplying said user-specific information to a corresponding processor interface on said separate processor body.

2. A portable pen pointing device according to claim 1, wherein said user-specific penmanship/handwriting information includes at least one of trace information for interpreting tracing of strokes in the penmanship/handwriting, writing order information for interpreting a stroke-writing order in the penmanship/handwriting, writing pressure information for interpreting a writing pressure in the penmanship/handwriting and speed information for interpreting a speed in the penmanship/handwriting.

3. A processing system with pen pointing device and a separate processor, comprising:

a portable pen pointing device in the form of a portable pen and which is handled like a pen to input information to a separate processor body, the portable pen pointing device including therein:

memory means for storing user-specific information corresponding to user-specific penmanship/handwriting information for interpreting penmanship/handwriting in consideration of the user's specific penmanship/handwriting style, and pen interface means for supplying the user-specific penmanship/handwriting information to said processor body, said user-specific information includes a user-specific personal identification code and the corresponding user's signature; and a processor, disposed within said processor body, for performing a predetermined processing in accordance with the writing sample input to said processor body, said processor including:

processor interface means for receiving at least the user-specific penmanship/handwriting information from said pen interface means of said portable pen pointing device, means for making a judgement of whether or not said user-specific personal identification code is registered in said processor, means for receiving input of the user's signature, means for receiving the user-specific penmanship/handwriting information from said processor interface means to perform a processing based on said registered penmanship/handwriting information when said user-specific personal identification code is judged to be registered in said processor, and means for judging whether or not the input signature matches the user's signature corresponding to said user-specific personal identification code judged to be registered in said processor.

4. A processing system with pen pointing device according to claim 3, wherein said user-specific penmanship/handwriting information includes at least one of trace information for interpreting tracing of strokes in the penmanship/handwriting, writing order information for interpreting a stroke-writing order in the penmanship/handwriting, writing pressure information for interpreting a writing pressure in the penmanship/handwriting and speed information for interpreting a speed in the penmanship/handwriting.

5. A processing system with pen pointing device according to claim 3, wherein said pen interface means of said portable pen pointing device and said processor interface means of said processor are brought into engagement with each other in a concavo-convex relationship to provide an electrical connection therebetween.

6. A processing system with pen pointing device according to claim 3, wherein said pen interface means of said portable pen pointing device and said processor interface means of said processor are connected with each other by electric wave or light in a non-contact relation.

7. A processing system with pen pointing device according to claim 3, wherein said processor further includes means for changing said user-specific penmanship/handwriting information, and the contents of change are also stored in said memory means of said portable pen pointing device.

8. A processing system with pen pointing device according to claim 3, wherein a host computer is provided, and said host computer and said processor are connected by a network.

9. A processing system with pen pointing device according to claim 3, wherein said host computer includes means for storing the user-specific penmanship/handwriting information.

10. A processing system with pen pointing device according to claim 3, wherein a writing gesture is previously stored as said penmanship/handwriting information in said memory means, and said processor further includes means for changing the penmanship/handwriting information input through said processor interface means when information input from said pen pointing device corresponds with said writing gesture stored in said memory means.

11. A processing system with pen pointing device according to claim 10, wherein a second writing gesture is previously stored as said penmanship/handwriting information in said memory means, and said processor further includes means for storing the penmanship/handwriting information changed by said penmanship/handwriting changing means in said memory means when information input through said pen pointing device coincides with said second writing gesture stored in said memory means.

12. A processing system with pen pointing device and a separate processor, comprising:

a portable pen pointing device in the form of a portable pen and which is handled like a pen to input information to a separate processor body, the portable pen pointing device including:

memory means for storing user-specific personal identification information, including the user's specific penmanship/handwriting information, for a user, and pen interface means for supplying said user-specific personal identification information to said separate processor body; and a processor for performing a predetermined processing in accordance with a user's penmanship/handwriting input to said processor body after judging the user's specific penmanship/handwriting information to be stored, said processor being connected by a network to a host computer which includes memory means for storing the user's specific penmanship/handwriting information for interpreting a penmanship/handwriting sample in consideration of the user's specific penmanship/handwriting information, said processor including:

processor interface means, disposed within said processor body, for receiving said user's specific personal identification information from said pen interface means of said portable pen pointing device, means for making the judgement of whether or not said user's specific personal identification information is stored and means for receiving, when said user's specific personal identification information is judged to be stored, said user's specific penmanship/handwriting information from said host computer to perform a processing based on said user's specific penmanship/handwriting information.

\* \* \* \* \*